Figure 1:
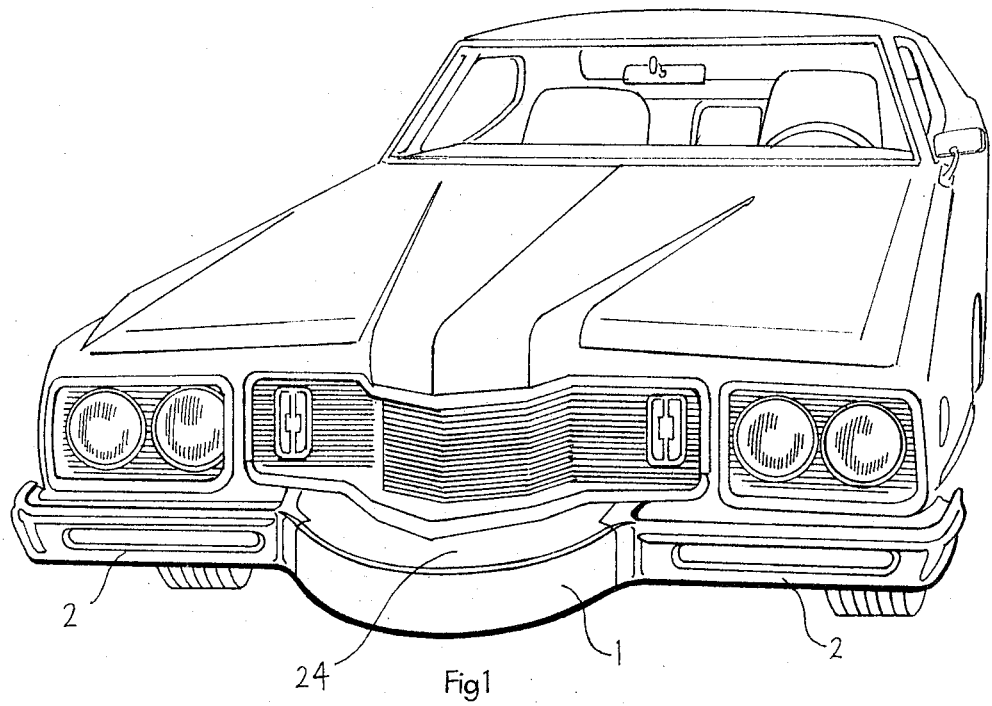

United States Patent [19]

Eshelman

[11] 3,845,977

[45] Nov. 5, 1974

[54] PNEUMATIC SHOCK ABSORBING TIRE BUMPER SYSTEM

[76] Inventor: Cheston Lee Eshelman, 621 N.E. 30th Ter., Miami, Fla. 33137

[22] Filed: Jan. 22, 1973

[21] Appl. No.: 325,822

[52] U.S. Cl. ............ 293/19, 224/42.04, 293/71 P, 293/84, 293/89
[51] Int. Cl. ... B60r 19/10, B61f 19/04, B61g 11/12
[58] Field of Search ........... 293/1, 17, 19, 69 R, 70, 293/71 R, 72, 71 P, 84, 89; 224/42.04, 42.21, 42.23, 22.05

[56] References Cited
UNITED STATES PATENTS

| | | | |
|---|---|---|---|
| 1,672,335 | 6/1928 | O'Meara | 224/42.04 |
| 1,792,157 | 2/1931 | Franke | 293/72 |
| 2,131,746 | 10/1938 | Morrison | 224/42.04 X |
| 2,196,225 | 4/1940 | Morrison | 224/42.04 |
| 3,502,362 | 4/1970 | Eshelman | 293/19 |
| 3,603,633 | 9/1971 | Eshelman | 293/19 |
| 3,708,195 | 1/1973 | Kottsieper | 293/19 |

Primary Examiner—M. Henson Wood, Jr.
Assistant Examiner—Howard Beltran

[57] ABSTRACT

In a highway type motor vehicle, a vehicle wheel and wheel mounted pneumatic tire positioned in the front or rear of the vehicle, with the wheel and tire substantially parallel to the highway surface about the height of a standard automobile bumper and having means for supporting the approximate center and rear portion of said tire and wheel securely in a housing with a king-pin and slotted hole and/or the alternative track each having members being connected to the frame of the vehicle so that the front exposed tire and wheel will act as a pneumatic bumper system having on each side of the tire and wheel a lateral motion, fulcrum-hinged, bumper-bars, that are thrust inward against the spare tire, as they move aft upon collision, into an obstruction, at the front or corner of the vehicle, dissipating the energy of motion into the pneumatic tire, instead of destruction of the sheet metal, because the energy of motion is used up in the 360° compression of the spare tire and wheel (front, rear, R side, L side) upon collision into an obstruction at the front or corner areas of the vehicle.

7 Claims, 9 Drawing Figures

PNEUMATIC SHOCK ABSORBING TIRE BUMPER SYSTEM

This application contains similar subject matter to that disclosed in my copending applications, Ser. No. 228,035; filed Feb. 22, 1972 and Ser. No. 311,366; filed Nov. 27, 1972.

My invention relates to an improvement in a Pneumatic Bumper system for a highway vehicle using a pneumatic tire and wheel, mounted to the front or rear of the vehicle so that it will operate to absorb the energy of a collision, to offer "crash-worthiness," and to help protect the occupants from death or injury and help prevent the vehicle from unnecessary damage in a collision.

With the ever-increasing use of express highways and the high cruising speed of modern automobiles plus the increased number of vehicles on the roads, there is a steady increase in traffic collisions with many deaths and serious injuries due to high speed collision with a barrier or headon collision into an oncoming vehicle. One can hardly read a newspaper or watch the news on television without seeing a head-on collision of an automobile resulting in fatalities or injuries.

With all of the developments in modern passenger automobiles, trucks, busses, and station wagons including the engines and bodies, the bumpers have been neglected by the industry. The modern bumper has been found to be an ornamental feature rather than what its name implies.

The standard pneumatic tire and pressed steel wheel are very rugged and will resist being compressed out of their round shape. In most serious accidents, where the vehicle body is compressed out of shape and the engine is torn from its mounts, the spare tire and wheel are not damaged nor are the wheels on the vehicle.

There are between 26 and 29 inches of absorption material, measured along a diameter of the wheel, consisting, in order, of a layer of rubber and cord, a layer of compressed air, a pressed steel wheel, another layer of compressed air, and another layer of rubber and cord. All these layers must be collapsed before the struck object can reach the main body or cab of the vehicle.

The advantages of this thickness of absorption materials are obvious in absorbing the energy of collision and decelerating the vehicle whereby fatalities, serious injuries and property damage are reduced by an estimated 50 percent. Tests have shown that a car equipped as described above can drive head on into a concrete wall at 40 miles per hour and not break the headlights.

It is an object of my invention to supply an absorption device which I have named the "pneumatic bumper system." This device will absorb the energy of a collision to an extent far greater than is possible with pressed steel, rigid bumper bars that have no lateral movement.

It is a further object of my invention to provide small, medium, and large automobiles, trucks, busses, and station wagons with the disclosed air bumper mounted as described.

It is a still further object of my invention to move the spare tire and wheel from the trunk of the vehicle or other storage space and to mount them on the vehicle in front and substantially parallel with the road surface.

It is another object of my invention to so mount the wheel on the front of the vehicle that it will be interposed between the vehicle and any barrier with which a collision may occur.

It is yet another object of my invention to provide the tire portion of the pneumatic bumper system with a flexible removable cover to protect it from the elements.

It is yet another object of my invention to provide means for lateral-motion, fulcrum-hinged, bumper bars which are thrust inward against the spare tire, as they move aft, upon collision, into an obstruction, at the front or corner of the vehicle, dissipating the energy of motion into the pneumatic tire, instead of destruction of the sheet metal.

It is yet another object of my invention to manage the energy of motion by using it up in the 360° compression of the spare tire and wheel (front, rear, R side, L side) with gradual dissipation of forces.

FIG. 1, Three-quarter front view of car with pneumatic bumper system installed on the front of the car.

Figure 2:
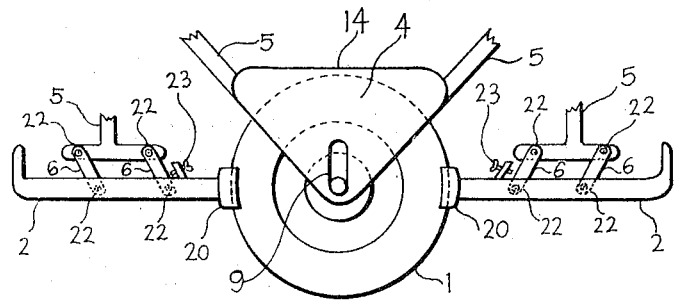

FIG. 2, Top view of pneumatic bumper system not installed.

Figure 3:
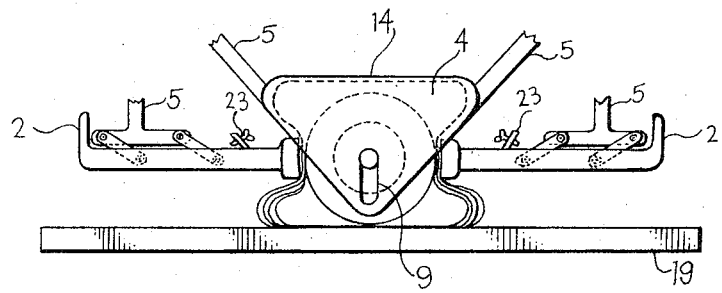

FIG. 3, Top view of pneumatic bumper system with a head-on collision into a barrier.

Figure 4:
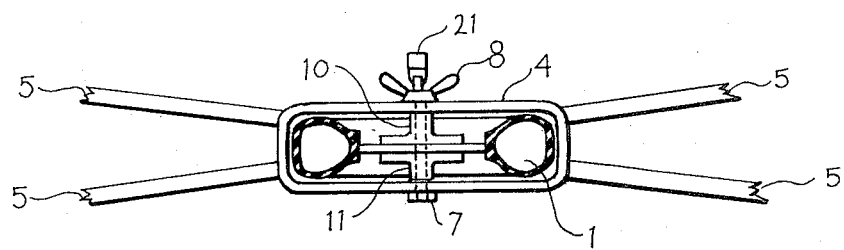

FIG. 4, Front view of tire and wheel installed in the housing.

Figure 5:
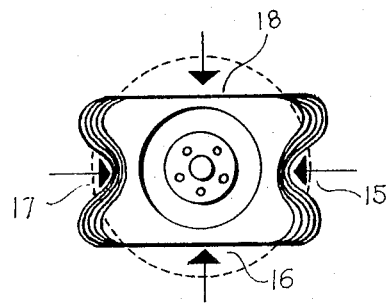

FIG. 5, Top view showing tire compressed from all four sides as in a total front collision.

Figure 6:
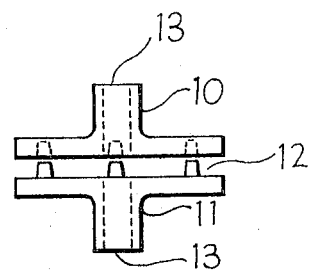

FIG. 6, Front view of male and female hub spacers.

Figure 7:
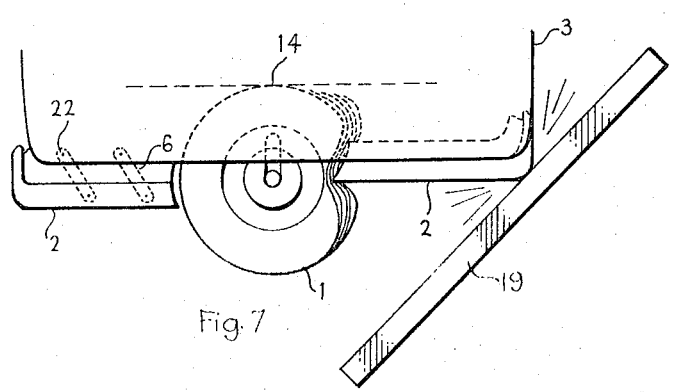

FIG. 7, Top view of pneumatic bumper system with corner collision into a barrier.

Figure 8:
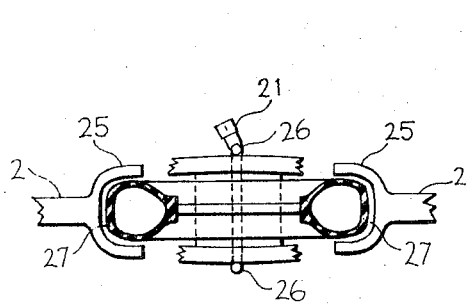

FIG. 8, Front view of alternate track mounting of tire and wheel using track.

Figure 9:
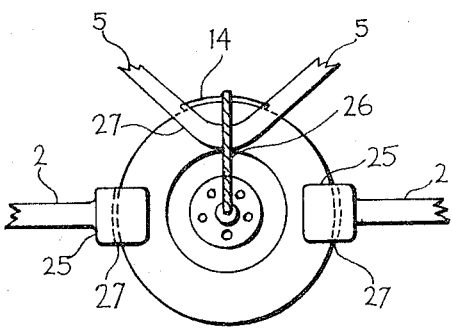

FIG. 9, Top view of alternate track mounting of tire and wheel using track.

No. 1 — Spare tire and wheel.
No. 2 — Lateral motion side bumper bars.
No. 3 — Car.
No. 4 — Housing.
No. 5 — Support members from housing and bumper bar hinges to frame of car.
No. 6 — Fulcrum hinge links mounting arms from bumper bars to frame of car.
No. 7 — King pin.
No. 8 — Wing nut.
No. 9 — Slotted hole in top and bottom wall of housing.
No. 10 — Female hub spacer.
No. 11 — Male hub spacer.
No. 12 — Lug hole studs.
No. 13 — Hole for king pin.
No. 14 — Stop in back of housing attached to frame of vehicle to prevent tire from moving aft beyond that point.
No. 15 — Impression made by thrust of L. bumper bar on impact into a barrier.
No. 16 — Impression made by collision into a barrier.
No. 17 — Impression made by thrust of R. bumper bar.
No. 18 — Impression made by collision into barrier forcing tire back in housing.
No. 19 — Barrier.
No. 20 — Small foot on inside end of bumper bar.

No. 21 — Lock.
No. 22 — Pivot bolts.
No. 23 — Adjustment retainer.
No. 24 — Cover.
No. 25 — Alternate large "U"-shaped foot that fits over tire profile to form a track.
No. 26 — Retainer cable or other flexible means for retaining tire and wheel.
No. 27 — Track.

The pneumatic bumper system utilizes the spare tire 10 as an energy absorber in front and corner collisions because the tire and wheel are mounted in the front of the car about the standard bumper height in a substantially horizontal position and it is held securely in that position by a pressed steel housing 4, king pin 7, and slotted hole 9, or in a separate arrangement with large U-shaped feet 25 forming a track 27 each having sufficient strength to hold the tire and wheel secured to the frame of the vehicle by support members 5. Tubes supporting members 5 will be of various sizes, shapes, and numbers to conform with the various cars 3 that they attached to, all having different numbers, types, and dimensions of frame structures.

The tire and wheel 1 fit inside the housing 4 with the front portion exposed for bumping. Bumper bars 2 on each side of the tire are held in place by a fulcrum-hinged, mounting arms 6 or links attached to frame 5, which extends from the hard points or frame of the vehicle 3 to the bumper bars 2. These fulcrum-hinged mounting arms rotate on pivot bolts 22 and are set on an angle so as to force the bumper bars 2 inward upon impact into a barrier 19. The small foot 20 on the inside ends of the bumper bars compresses into the tire and thus moves inward and aft at the same time upon impact and this tends to dissipate the forces of energy into the tire 1. If the collision is directly in front of the car 3 the front profile of the tire 1 will absorb the crash and then push it aft in the slotted hole 9 in the housing 4 or ends of the large U-shaped feet track 27, traveling in the slot 9 or track 27 provided in the top and bottom of the housing 4 or ends of the large U-shaped feet 25. The profile of the tire flattens out against the back stop 14 as it travels aft in the slot 9 and/or track 27.

If the collision is severe enough it will make contact with the bumper bars 2 on either side of the tire 1 and they will also move aft together and when they move aft they will also move inward against the tire 1 because they are mounted on fulcrum-hinged mounting arms 6 or links that rotate on pivot bolts 22 which thrust the bumper bars 2 into the tire 1. This gives the effect of squeezing the tire from all four sides on a hard frontal impact or on each side on a corner impact. An adjustment retainer 23 prevents the bars moving outward and also adjusts them for clearance from the tire to install a cover. Bumper bars 2 can only move inward and aft; they can not move outward.

The wheel has a spacer 10 on the top side and a spacer 11 on the bottom side which fits in the hub of the wheel by lug hole studs 12, and a king pin 7 in the hole 13 which is secured by a wing nut 8. This arrangement holds the wheel in horizontal position and lateral position as it is struck by the forces of a collision. It can only move aft in the slot 9 and/or track 27.

The tire and wheel can be removed by hand without tools, for the purpose of using it for a spare. I have provided for a lock 21 at the top of king pin 7 and/or retainer cable 26 to prevent theft or loss.

15 is the impression made in the tire profile by the L. bumper bar as in a hard corner collision. 16 is the impression made in the tire profile by a hard frontal collision. 17 is the impression made in the tire profile by the R. bumper bar on a hard corner collision and 18 is the impression made in the tire profile as the result of a hard front collision or the combination of all of them together. A flexible cover 24 is provided for the tire and wheel to protect it from the elements and to enhance the esthetics.

I have provided for an alternate holding support for the tire and wheel which I call the track 27, which consists of a large U-shaped foot 25 attached to each inside end of bumper bars 2 supporting each side of the tire profile and another foot 25 at the rear stop frame 14 thus forming a track for the tire and wheel to travel in, eliminating the necessity of a king pin 7 and hub spacers 10 and 11, and slotted hole 9. A retainer cable 26 passes through the hub of the wheel and behind the stop 14 on the frame 5 to secure the tire and wheel in place with a lock 21 so as to prevent it from theft and flying out of place as a missile in a hard freakish collision.

Having thus described my invention, I claim:

1. In a motor vehicle, an energy absorbing bumper system comprising in combination, a wheel mounted pneumatic tire positioned horizontally on the forward end of the vehicle so as to extend forwardly of most vehicular elements, said wheel and tire being carried by structural means on the vehicle which is constructed and arranged to accommodate limited movement of the wheel and tire rearwardly of the vehicle upon striking an obstruction forwardly of the vehicle, and a pair of movable bumper bars extending horizontally and transversely of the vehicle, one bar on each side of said wheel and tire with a bar end in contact with the tire, and fulcrum-hinge means for each bumper bar for connecting it to an adjacent part of the vehicle so that said bumper bar will be thrust forcibly against the tire when the bumper bar strikes an obstruction before it.

2. The invention as set forth in claim 1, in which the structural means which carries the wheel and tire includes a slotted aperture longitudinally of the vehicle, a king-pin in the aperture for mounting the wheel and tire, and a stop for limiting the rearward movement of the wheel and tire.

3. The invention as set forth in claim 1, in which the fulcrum-hinge means comprises a structural element extension of the vehicle frame having an arm parallel to the bumper bar, and horizontally swingable connecting means between the bumper-bar and parallel arm whereby the bumper-bar is provided with limited horizontal movement both transversely and longitudinally of the vehicle.

4. The invention as set forth in claim 3, in which the horizontally swingable connecting means comprises a plurality of parallel hinge links each being pivotally connected to said parallel arm and said bumper bar, said hinge links being always pointed toward the forward extension of the vehicle center line.

5. The invention as set forth in claim 1, having means for easy removal of the wheel and tire comprising a removable king-pin, a pair of hub spacers, and a wing nut, said wheel and tire being clamped by the wing nut on the king-pin between the hub spacers.

6. The invention as set forth in claim 1, in which an adjustment retainer is provided on each bumper bar to limit its movement in a direction away from the wheel and tire.

7. The invention as set forth in claim 1, in which the end of each bumper bar adjacent the wheel and tire is provided with a large U-shaped foot to partially surround and support the wheel and tire.

* * * * *